United States Patent [19]

Kuehmichel et al.

[11] Patent Number: 4,826,184
[45] Date of Patent: May 2, 1989

[54] SNOWMOBILE POWER STEERING SYSTEM

[76] Inventors: Blaine G. Kuehmichel, 3011 Jefferson St., Atlanta, Ga. 30341; Randall J. Kuehmichel, 404 Buse St., Spenser, Wis. 54479

[21] Appl. No.: 34,985

[22] Filed: Apr. 6, 1987

[51] Int. Cl.$^4$ .............................................. B62B 17/00
[52] U.S. Cl. .............................. 280/21.1; 137/625.25
[58] Field of Search ............... 180/182, 190, 191, 192, 180/193; 280/16, 21 R, 21 A; 137/625.25

[56] References Cited

U.S. PATENT DOCUMENTS

| | | | |
|---|---|---|---|
| 2,768,699 | 10/1956 | Gardiner et al. | 180/156 |
| 3,166,338 | 1/1965 | Romsdal | 280/21 R |
| 3,550,706 | 12/1970 | Watkins | 180/190 |
| 3,653,453 | 4/1972 | Tiltola | 180/190 |
| 3,835,947 | 9/1974 | Alexander, Jr. | 280/21 R |
| 4,003,404 | 1/1977 | Burckhardt | 180/132 X |
| 4,077,639 | 3/1978 | Reedy | 180/190 X |
| 4,317,800 | 5/1985 | Karakama et al. | 180/132 X |
| 4,319,656 | 3/1982 | Kobayashi | 180/190 X |
| 4,352,501 | 10/1982 | Takagi | 280/16 |
| 4,361,339 | 11/1982 | Kobayashi | 280/21 R |
| 4,364,447 | 12/1982 | Yoshida | 180/182 |
| 4,374,591 | 2/1983 | Kobayashi | 280/21 R |
| 4,440,254 | 4/1984 | Shibahata et al. | 180/140 |
| 4,462,209 | 7/1984 | Thomsen et al. | 180/132 X |
| 4,509,766 | 4/1985 | Yasui et al. | 280/21 R |
| 4,591,173 | 5/1986 | Marier | 280/21 R |

Primary Examiner—John A. Pekar
Attorney, Agent, or Firm—Lathrop & Clark

[57] ABSTRACT

A snowmobile power steering system on a snowmobile having a body with a chassis and a pair of laterally spaced steerable skis includes a source a hydraulic pressure including a reservoir for storing hydraulic fluid, a hydraulic cylinder which is mounted to the snowmobile body and has two chambers and at least one end rod, a steering column, and a linkage arrangement including interconnected connecting rods and pivotal members which together transmit force from the steering column to the skis. The linkage arrangement is operably connected to the hydraulic cylinder end rod so that movement of the end rod rotates the skis. A selected connecting rod includes a valve which selectively directs hydraulic pressure to one hydraulic cylinder chamber to move the end rod so the skis rotate in the first direction when the selected connecting rod transmits a tensile force. The valve directs hydraulic pressure to the other cylinder chamber to move the end rod so the skis rotate in a second direction when the selected connecting rod transmits a compressive force. The selected connecting rod is able to transmit both tensile and compressive forces, and has at least one elastic member which biases a spool within the valve toward its central position. At least one of the orifices within the valve near the spool is ellipsoidal in shape.

21 Claims, 8 Drawing Sheets

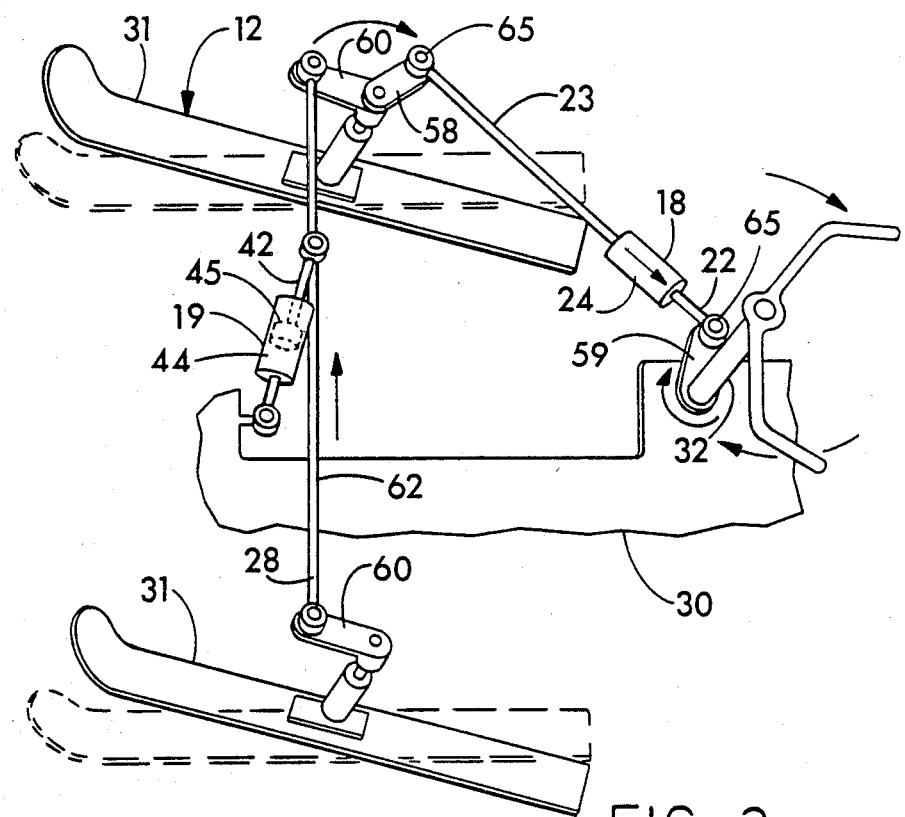
FIG. 3
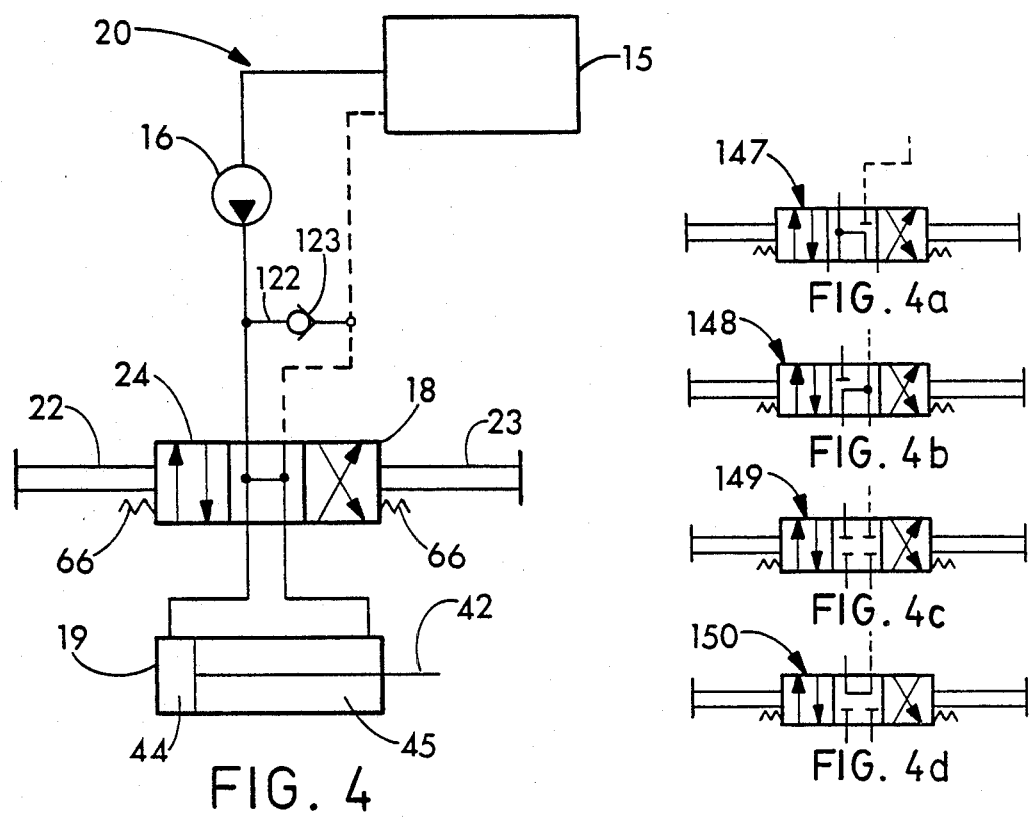
FIG. 4
FIG. 4a
FIG. 4b
FIG. 4c
FIG. 4d

SNOWMOBILE POWER STEERING SYSTEM

BACKGROUND OF THE INVENTION

1. Field of the Invention

This invention pertains generally to the field of steering systems for snowmobiles, and particularly to a snowmobile power steering system.

2. Description of the Prior Art

Various types of steering mechanisms have been designed and are currently used for snowmobiles. The systems generally include the steering column and a linkage arrangement which transmits forces from the steering column to the skis. One such steering system is shown in U.S. Pat. No. 3,550,906 to Watkins. Snowmobile steering systems have been developed in which the steering is cushioned such as those disclosed in U.S. Pat. Nos. 4,509,766 to Yasui et al., No. 4,374,591 to Kobayashi, and No. 4,352,501 to Takagi. These cushioned steering systems generally include a shock absorbing means which dampens the telescopic movement of portions of the steering mechanism. The effect is to allow smoother steering in typical steering linkage systems.

Many power steering systems have been developed for motor vehicles. The U.S. Pat. No. 4,003,404 to Burckhardt discloses a servo-steering system for vehicles utilizing a servo-control valve which responds to motion of a steering nut movable on the steering spindle to control the steering adjuster. The U.S. Pat. No. 4,440,254 to Shibahata et al. discloses a compliance steering control system for four-wheeled vehicles which directs pressure to a hydraulic servo to help turn the front wheels in response to the rotation of the steering wheel, and which also tends to turn the pair of rear wheels in the same direction that the front pair of wheels is turned in response to the rotation of the steering wheel. A hydraulic control unit for a power steering assembly is disclosed in U.S. Pat. No. 4,462,209 to Thomsen et al. The unit has a metering motor and steering wheel actuated valves for directing metered pressurized fluid to one selected port of a steering servo-motor and withdrawing fluid from the other port of the servo-motor to a reservoir. The unit utilizes a particular regulating valve for directing pressurized fluid to other consumer units when the steering control is in neutral. A hydraulic control system for off-highway self-propelled work machines is disclosed in U.S. Pat. No. 4,517,800 to Karakama et al. This control system has two fixed-displacement pumps for supplying pressurized fluid to a pair of steering cylinders via a steering valve and to a pair of implement cylinders via an implement valve. This system is generally used with large off-road work machines such as graders and dump trucks.

Snowmobile skis tend to develop an oscillating motion which is dependent on the length of the ski in contact with the ground surface. This oscillating motion varies with speed and is transmitted through the steering linkage. If this oscillating motion is transferred to the control valve of a power steering system, the power steering will develop a chatter. In the prior art, either a coil spring or a torsion bar was used to control the deflection of the control valve. Both coil springs and torsion bars have natural frequencies of their own. Therefore, when another frequency is introduced to these parts, they may either magnify or absorb the oscillating motion. If the coil spring or torsion bar magnifies the oscillating motion, the chatter within the steering mechanism may render the snowmobile uncontrollable.

SUMMARY OF THE INVENTION

The present invention solves the aforementioned and other problems of the prior art, and provides a power steering system for steering snowmobiles. Snowmobiles generally have a body with a chassis, and a pair of laterally spaced steerable skis. The power steering system includes a source of hydraulic pressure with a reservoir for storing hydraulic fluid, a hydraulic cylinder which is mounted to the snowmobile body and has two chambers and at least one end rod, a steering column, and a linkage arrangement which includes interconnected connecting rods and pivotal members which together transmit force from the steering column to the skis to selectively rotate the skis. When the skis are being rotated in a first direction by force transmitted from the steering column, a selected connecting rod transmits a tensile force. When the skis are being rotated in a second direction by force transmitted from the steering column, the selected connecting rod transmits a compressive force. The linkage assembly is operably connected to the hydraulic cylinder end rod so that movement of the end rod rotates the skis.

The selected connecting rod includes a control valve which selectively directs hydraulic pressure to one of the hydraulic cylinder chambers to move the end rod so the skis rotate in the first direction when the selected connecting rod transmits a tensile force. The control valve selectively directs hydraulic pressure to the other hydraulic cylinder chamber to move the end rod so the skis rotate in a second direction when the selected connecting rod transmits a compressive force. In this manner the hydraulic cylinder augments the force transmitted to the linkage arrangement by the steering column. The selected connecting rod includes two connecting portions through which the control valve is connected to a remainder of the linkage assembly.

The control valve is a four-way, three-position control valve which includes a spool which is rigidly connected to one of the connecting portions, a valve housing which is rigidly connected to the other connecting portion, and a means for biasing the spool to a central position and for transmitting tensile and compressive forces between the valve housing and spool so that force can be transmitted from a connecting portion to the spool, through the spool central biasing and force transmitting means to the valve housing and then to the other connecting portion. The spool includes a first, second, and third wide damper portions, a first narrow portion between the first and second wide damper portions, and a second narrow portion between the second and third wide damper portions. The valve housing has a back end, a front end, and an axial bore which opens to at least the back end of the valve housing and which substantially contains the spool. A control portion of the axial bore has a diameter which is substantially equal to that of the spool wide damper portions. The inner surface of the control portion of the axial bore and the narrow portions of the spool define a first and a second slidable passageways.

The valve housing has several other passageways. The valve housing has a first return passageway which communicates with the reservoir and with the axial bore in proximity to the spool first wide damper portion through a first return orifice, a first cylinder passageway located forwardly from the first return passageway and communicating with one of the hydraulic cylinder chambers and the axial bore at the first slidable passageway through a first cylinder orifice, and a pressure passageway located forwardly from the first cylinder passageway. The pressure passageway communicates with the source of hydraulic pressure and the axial bore in proximity to the spool second wide damper portion through a pressure orifice. Additionally, the valve housing has a second cylinder passageway located forwardly from the pressure passageway which communicates with another of the hydraulic cylinder chambers and the axial bore at the second slidable passageway through a second cylinder orifice, and a second return passageway located forwardly from the second cylinder passageway and communicating with the reservoir and the axial bore in proximity to the spool third wide damper portion through a second return orifice.

The spool is axially slidable within the axial bore between three positions. In its rearward position, hydraulic pressure is directed from the pressure passageway through the second slidable passageway to the second cylinder passageway to thereby pressurize one of the cylinder chambers. In this position, the spool third wide damper portion blocks hydraulic pressure from entering the second return passageway from the second slidable passageway so that the pressure is forced to enter the second cylinder passageway. Hydraulic fluid is exhausted from the first cylinder passageway through the first slidable passageway into the first return passageway. In this manner the other cylinder chamber is exhausted. The spool second wide damper portion blocks hydraulic pressure from entering the first slidable passageway of the pressure passageway.

When the spool is in its central position, the spool second wide damper portion at least partially blocks the pressure passageway so that the hydraulic pressure, if any, which is directed through the two slidable passageways to the cylinder passageways is equal. In this manner, if the cylinder chambers are pressurized at all, they are pressurized equally.

When the spool is in its forward position, hydraulic pressure is directed from the pressure passageway through the first slidable passageway to the first cylinder passageway. In this manner, the cylinder chamber which formerly was exhausted when the spool was in its rearward position is now pressurized. The spool first wide damper portion blocks hydraulic pressure from entering the first return passageway from the first slidable passageway, thereby insuring that all of the hydraulic pressure enters the first cylinder passageway. Hydraulic fluid is exhausted from the second cylinder passageway through the second slidable passageway to the second return passageway, thereby exhausting the cylinder chamber which formerly was pressurized. The spool second wide damper portion blocks hydraulic pressure from entering the second slidable passageway from the pressure passageway.

Preferably, the pressure and return orifices are ellipsoidal in shape with their minor axes parallel to an axis of the spool, so that relatively little axial movement of the spool from its central position is required to change the flow of hydraulic fluid from the pressure passage into one of the slidable passageways, or to change a flow of hydraulic fluid from one of the slidable passageways into an adjacent return passageway.

Preferably, the central position biasing and force transmitting means includes a spool rearward-facing surface which moves axially with axial movement of the spool, a housing forward facing surface which is in fixed relation to the housing and is opposition to the spool rearward facing surface, a spool forward facing surface which moves axially with axial movement of the spool, a housing rearward facing surface which is maintained in a fixed relation with the housing and is in opposition to the spool forward facing surface, and at least one elastic member between those surfaces which are in opposition to one another.

The power steering system for steering snowmobiles functions to reduce driver effort in the operation of the sled. By reducing the steering effort the operator can achieve and maintain a greater degree of control in many situations, such as when the snowmobile is moving through deep or loose snow, or when rough, uneven surfaces are encountered. Additionally, the power steering system greatly reduces the chances of the steering handle bars being pulled from the operator's hands when the skis hit hidden obstructions such as rocks, stumps, or tree limbs. Furthermore, operator fatigue is reduced, making longer rides more enjoyable. The snowmobile power steering system allows the skis to give way slightly to obstacles which hit the skis with force. The power steering system then quickly returns the skis to their former position.

Further objects, features, and advantages of the invention will be apparent from the following detailed description when taken in conjunction with the accompanying drawings.

BRIEF DESCRIPTION OF THE DRAWINGS

In the drawings:

FIG. 3 is a perspective view of a third preferred embodiment of a snowmobile power steering system, with the pump and reservoir not shown.

FIG. 4 is a schematic diagram showing the hydraulic system of the snowmobile power steering system, utilizing a four-way, three-position open center control valve.

FIG. 4a is a schematic diagram of a four-way, three-position, return passageway blocked control valve which also may be used with the power steering system of the present invention.

FIG. 4b is a schematic diagram of a four-way, three-position, pressure passageway blocked control valve which also may be used in the power steering system of the present invention.

FIG. 4c is a schematic diagram of a four-way, three-position, blocked center control valve which also may be used in the power steering system of the present invention.

FIG. 4d is a schematic diagram of a four-way, three-position, tandem center control valve which also may be used in the power steering system of the present invention.

DESCRIPTION OF THE PREFERRED EMBODIMENT

Figure 1:
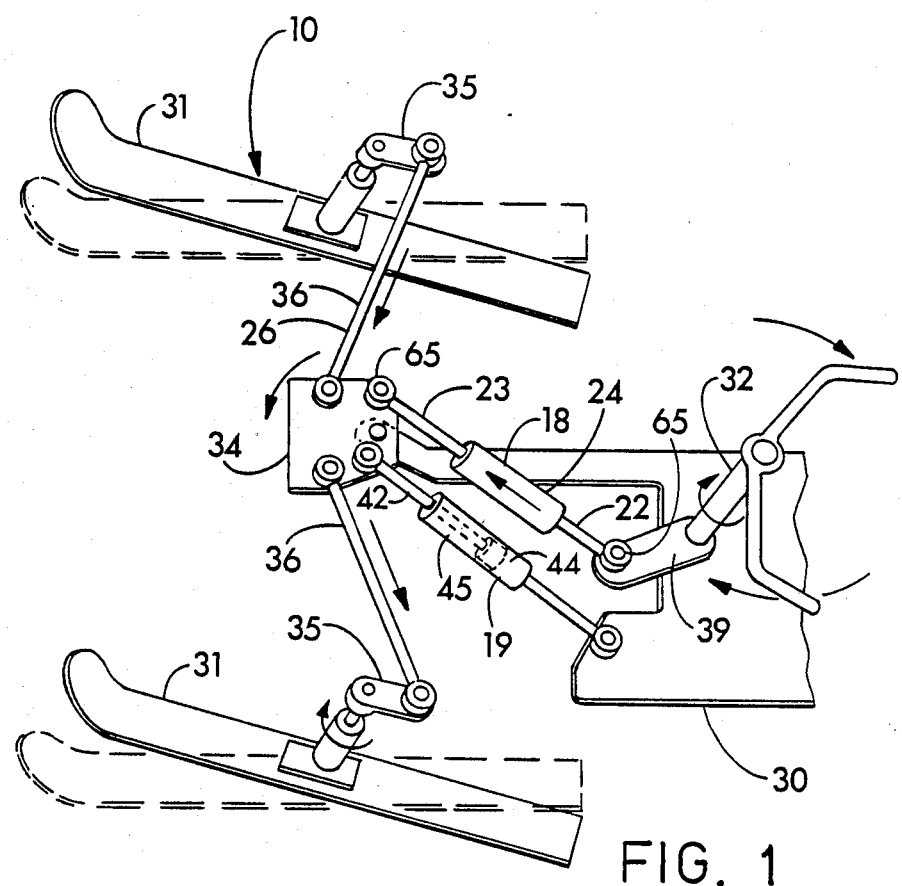
FIG. 1 is a perspective view of a first preferred embodiment of a snowmobile power steering system, with the pump and reservoir not shown.
Figure 2:
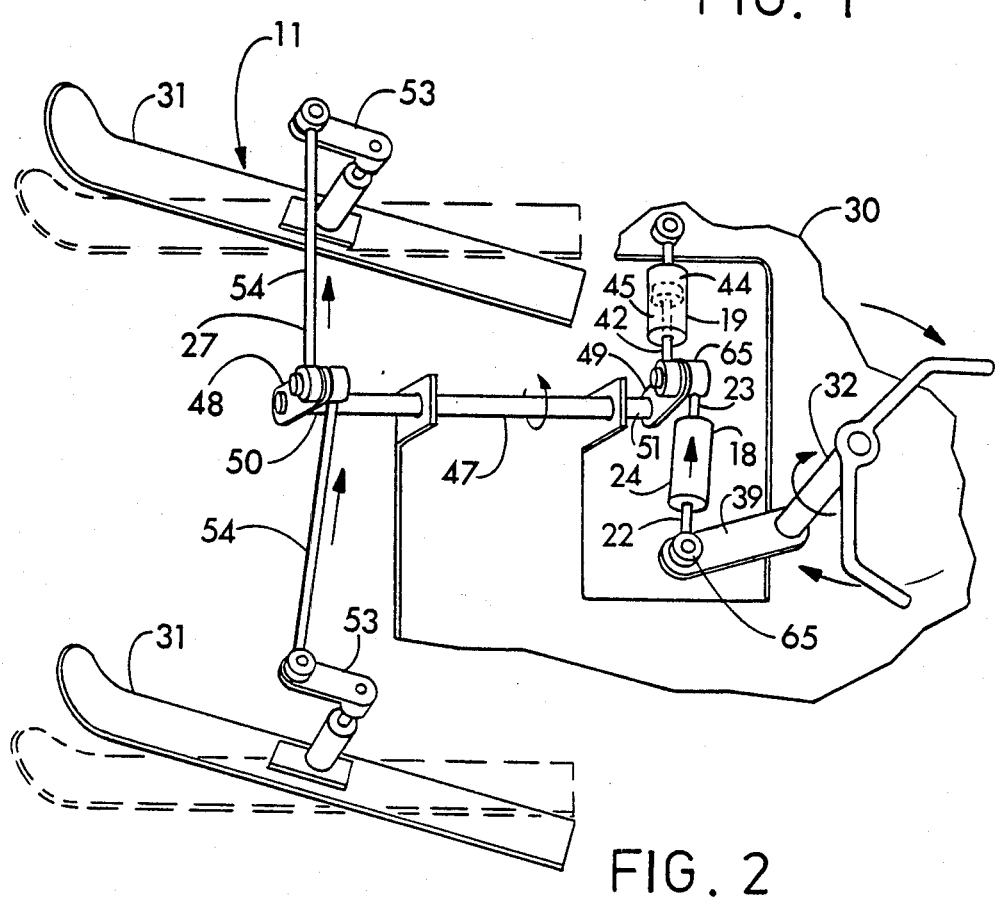
FIG. 2 is a perspective view of a second preferred embodiment of a snowmobile power steering system, with the pump and reservoir not shown.

With reference to the drawings, three preferred embodiments of the snowmobile power steering system 10, 11, and 12 are shown in FIGS. 1–3, with the reservoir 15 and hydraulic pump 16, which form the source of hydraulic pressure, omitted. The specific location of the reservoir 15 and hydraulic pump 16 within these three embodiments 10, 11, and 12 can vary, depending on convenience and on access to power for the pump 16. Therefore, the specific location of the reservoir 15 and hydraulic pump 16 are not shown in FIGS. 1–3. Preferably, the hydraulic pump 16 is driven by means of a high torque drive belt and pulley system, from either the drive axle or the secondary shaft of the snowmobile. The pump 16 should be of appropriate flow rate and should also have a pressure control valve which regulates maximum system pressure. FIGS. 1–3 do show the location and operation of the control valve 18 and hydraulic cylinder 19 within the steering systems 10, 11, and 12. FIG. 4 is a schematic diagram of the hydraulic system 20 of the snowmobile power steering system. The hydraulic system 20 includes the reservoir 15, the hydraulic pump 16, the control valve 18, and the hydraulic cylinder 19. Alternatively, an accumulator could be used in place of the reservoir 15. As shown schematically, connected to the control valve 18 are two connecting portions 22 and 23 which together with the control valve 18 comprise a selected connecting rod 24 which also is shown in FIGS. 1–3 as one of the connecting rods of the linkage arrangements 26, 27, and 28. The three embodiments shown in FIGS. 1–3 are conventional steering systems which have been retrofitted with the hydraulic system 20 to form power steering systems 10, 11, and 12. In each particular embodiment, the hydraulic cylinder 19 must have a displacement and stroke which is appropriate to the embodiment. Furthermore, the selected connecting rod 24 must be of appropriate length.

A snowmobile has a body with a chassis 30, and a pair of laterally spaced steerable skis 31, as shown in FIGS. 1–3. In all three figures, the linkage arrangements 26, 27, and 28 include interconnected connecting rods and pivotal members which together transmit force from the steering column 32 to the skis 31 to selectively rotate the skis 31. In addition to the pump and reservoir, the first preferred power steering system 10 shown in FIG. 1 includes the steering column 32, a pivotal plate member 34, which is pivotally connected to the chassis 30, two ski arm pivotal members 35 which are each in association with a ski 31 such that rotation of the ski arm pivotal member 35 causes rotation of the associated ski 31. In all the embodiments shown, all arm pivotal members function to transform linear forces into torques. The pivotal plate member 34 in the first embodiment 10 functions to change a linear force into a torque and then back into a linear force again. The linkage arrangement 26 shown in FIG. 1 further includes two steering connecting rods 36. Each steering connecting rod 36 at one end is pivotally connected to the pivotal plate member 34 and at the other end to a ski arm pivotal member 35 so that rotation of the plate member 34 in a first direction causes the skis 31 to rotate in a first direction and rotation of the plate member 34 in a second direction causes the skis 31 to rotate in a second direction. A steering arm pivotal member 39 is shown rigidly connected to the steering column 32. The selected connecting rod 24 at one end is pivotally connected to the steering arm pivotal member 39 and at the other end is pivotally connected to the pivotal plate member 34 so that any rotation of the steering column 32 which places the selected connecting rod 24 in tension causes the pivotal plate member 34 to rotate in the first direction, and any rotation of the steering column 32 which places the selected connecting rod 24 in compression causes the pivotal plate member 34 to rotate in the second direction. The hydraulic cylinder 19 at one end is pivotally connected to the snowmobile chassis 30. From another end extends the end rod 42 which is pivotally connected to the pivotal plate member 34.

The linkage arrangement 26 is therefore operably connected to the hydraulic cylinder end rod 42 so that movement of the end rod 42 rotates the skis 31. The selected connecting rod 24 includes a control valve 18 which selectively directs hydraulic pressure to the hydraulic cylinder chamber 44 to move the end rod 42 so that the skis 31 rotate in the first direction when the selected connecting rod 24 transmits a tensile force. In the embodiment shown in FIG. 1, the first direction is to the left. Any movement of the skis 31 which is caused by the selected connecting rod 24 being placed in tension, is defined to be movement "in the first direction", whether to the right or to the left in the particular embodiment. When the selected connecting rod 24 transmits a compressive force, the control valve 18 selectively directs hydraulic pressure to the other hydraulic cylinder chamber 45 to move the end rod 42 so the skis 31 rotate in the second direction. In the embodiment shown in FIG. 1, the second direction is to the right. Any motion of the skis 31 which results from the selected connecting rod 24 being placed in compression is defined to be movement "in the second direction", whether to the right or to the left in the particular embodiment. The hydraulic cylinder 19 augments the force transmitted to the linkage arrangement 26 by the steering column 32.

The linkage arrangement 27 shown in FIG. 2 includes a steering shaft pivotal member 47 which is rotatably mounted to the chassis 30, a forward shaft arm pivotal member 48 which is rigidly connected to a front end 50 of the steering shaft pivotal member 47, a rearward shaft arm pivotal member 49 which is rigidly connected to the back end 51 of the steering shaft pivotal member 47, and a steering arm pivotal member 39 which is rigidly connected to the steering column 32. Additionally, the linkage arrangement 27 includes two ski arm pivotal members 53 which are each in association with a ski 31 such that rotation of the ski arm pivotal member 53 causes rotation of the associated ski 31, two steering connecting rods 54, and the selected connecting rod 24. Each steering connecting rod 54 is pivotally connected at one end to the forward shaft arm pivotal member 48 and at another end to a ski arm pivotal member 53 so that rotation of the steering shaft pivotal member 47 in a first direction causes the skis 31 to rotate in a first direction, and rotation of the steering shaft pivotal member 47 in a second direction causes the skis 31 to rotate in a second direction. The selected connecting rod 24 at one end is pivotally connected to the steering arm pivotal member 39, and at the other end is pivotally connected to the rearward shaft arm pivotal member 49 so that any rotation of the steering column 32 which places the selected connecting rod 24 in tension causes the steering shaft pivotal member 47 to rotate in the first direction, and any rotation of the steering column 32 which places the selected connecting rod in compression causes the steering shaft pivotal member 47 to rotate in the second direction. The second embodiment of the snowmobile power steering system 11 furthermore includes a hydraulic cylinder 19 which at one end is pivotally connected to the snowmobile chassis 30. From the other end of the cylinder 19 extends the end rod 42 which is pivotally connected to the rearward shaft arm pivotal member 49. Again, the linkage arrangement 27 is therefore operably connected to the hydraulic cylinder 19 so that movement of the end rod 42 causes rotation of the skis 31 in one of two directions. When the selected connecting rod 24 transmits a tensile force, the control valve 18 selectively directs hydraulic pressure to the hydraulic cylinder chamber 44 to move the end rod 42 so the skis 31 rotate in the first direction which in this case is leftward. When the selected connecting rod 24 transmits a compressive force, the control valve 18 directs hydraulic pressure to the other hydraulic cylinder 45 to move the end rod 42 so the skis 31 rotate in the second direction which in this case is rightward. Again, the hydraulic cylinder 19 augments the force transmitted to the linkage arrangement 27 by the steering column 32.

Linkage arrangement 28 shown in FIG. 3 incldes a first ski arm pivotal member 58 which is in association with one ski 31 such that rotation of the first ski arm pivotal member 58 causes rotation of the associated ski 31, a steering arm pivotal member 59 which is rigidly connected to the steering column 52, and two second ski arm pivotal members 60 which are each in association with a ski 31 such that rotation of the second ski arm pivotal member 60 causes rotation of the associated ski 31, and rotation of the associated ski 31 causes rotation of the second ski arm pivotal member 60. Additionally, the linkage arrangement 28 includes a steering connecting rod 62 which at one end is pivotally connected to one of the second ski arm pivotal members 60, and at another end is pivotally connected to the other second ski arm pivotal member 60 so that the skis 31 rotate together. Lastly, the linkage arrangement 28 includes the selected connecting rod 24 which at one end is pivotally connected to the steering arm pivotal member 59 and at the other end is connected to the first ski arm pivotal member 58 so that any rotation of the steering column 32 which places the selected connecting rod 24 in tension causes the first ski arm pivotal member 58 to rotate in a first direction, and any rotation of the steering column 32 which places the selected connecting rod 24 in compression causes the first ski arm pivotal member 58 to rotate in a second direction. The third embodiment of the snowmobile power steering system 12 further includes the hydraulic cylinder 19 which at one end is pivotally connected to the snowmobile chassis 30. From another end of the cylinder 19 extends the end rod 42 which is pivotally connected to the steering connecting rod 62. The linkage arrangement 28 is therefore operably connected to the hydraulic cylinder end rod 42 so that any movement of the end rod 42 causes rotation of the skis 31. When the selected connecting rod 24 transmits a tensile force, the control valve 18 on the selected connecting rod 24 directs hydraulic pressure to the hydraulic cylinder chambers 44 to move the end rod 42 so the skis rotate in the first direction which in this case is to the left. When the selected connecting rod 24 transmits the compressive force, the control valve 24 selectively directs hydraulic pressure to the other hydraulic cylinder chamber 45 to move the end rod 42 so that the skis 31 rotate in the second direction which in this case is to the right. The hydraulic cylinder 19 therefore augments the force transmitted to the linkage arrangement 28 by the steering column 32. FIG. 3 demonstrates a right turn which puts the selected connecting rod 24 in tension. The skis 31 and the first ski arm pivotal member 58 are therefore considered to be rotating in the first direction.

As shown in FIG. 4, the preferred control valve 18 utilized is known in the art as a four-way, three-position, open center directional control valve 18. The control valve 18 operates direct hydraulic pressure to extend or retract a hydraulic cylinder end rod. The control valve 18 has a spool 64 which when in its central position allows the hydraulic pump 16 to unload to the reservoir 15. The control valve 18 also allows the hydraulic cylinder end rod 42 to move freely when the spool 64 is centered. A preferred embodiment of this type of control valve 18 is shown in FIGS. 5–14. The control valve 18 is connected near each end 77 and 78 to two connecting portions 22 and 23 which together with the control valve 18 comprise the selected connecting rod 24. Preferably, the connecting portions 22 and 23 include ball joints 65 at the ends thereof to allow for some flexibility in making connections with other components of the linkage arrangements 26, 27, and 28. Furthermore, as shown at 66 in FIG. 4, the spool 64 is biased to its central position.

Figure 11:
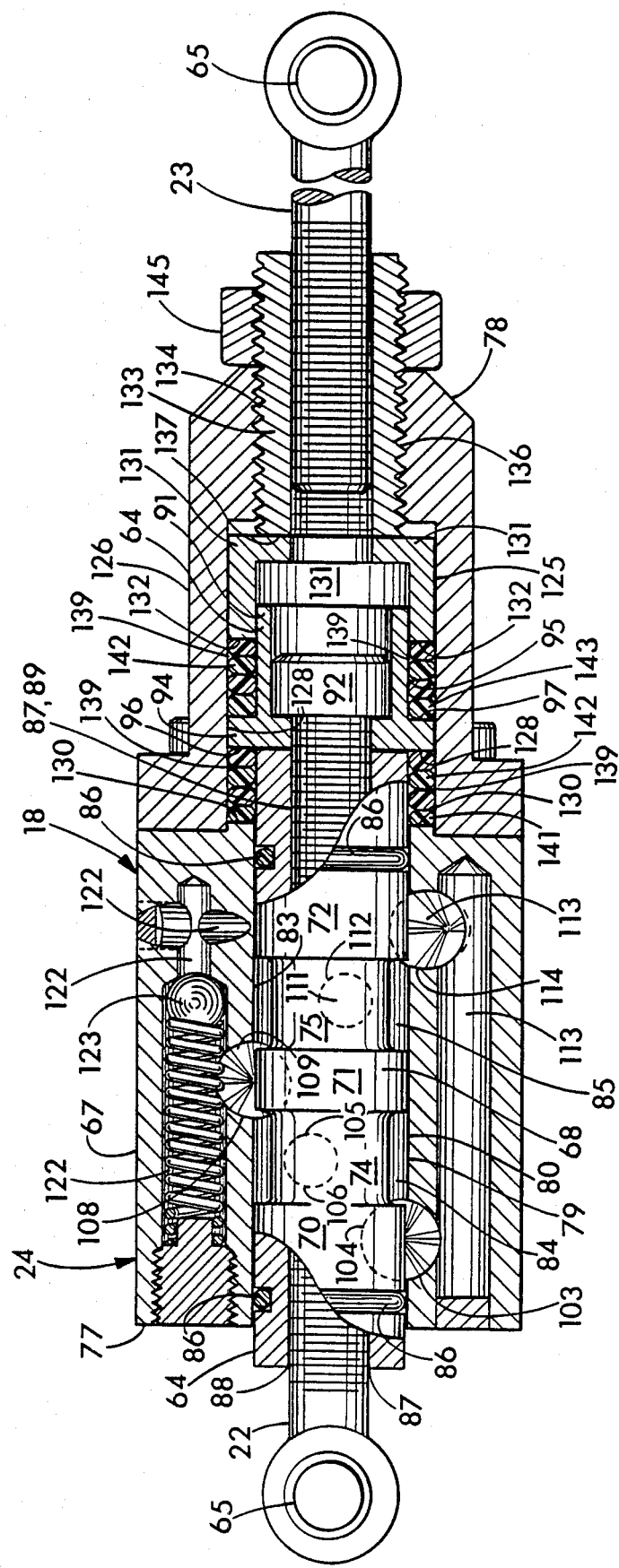
FIG. 11 is a longitudinal section view taken along section line 11—11 of FIGS. 6–10, also showing the spool in partial section.
Figure 12:
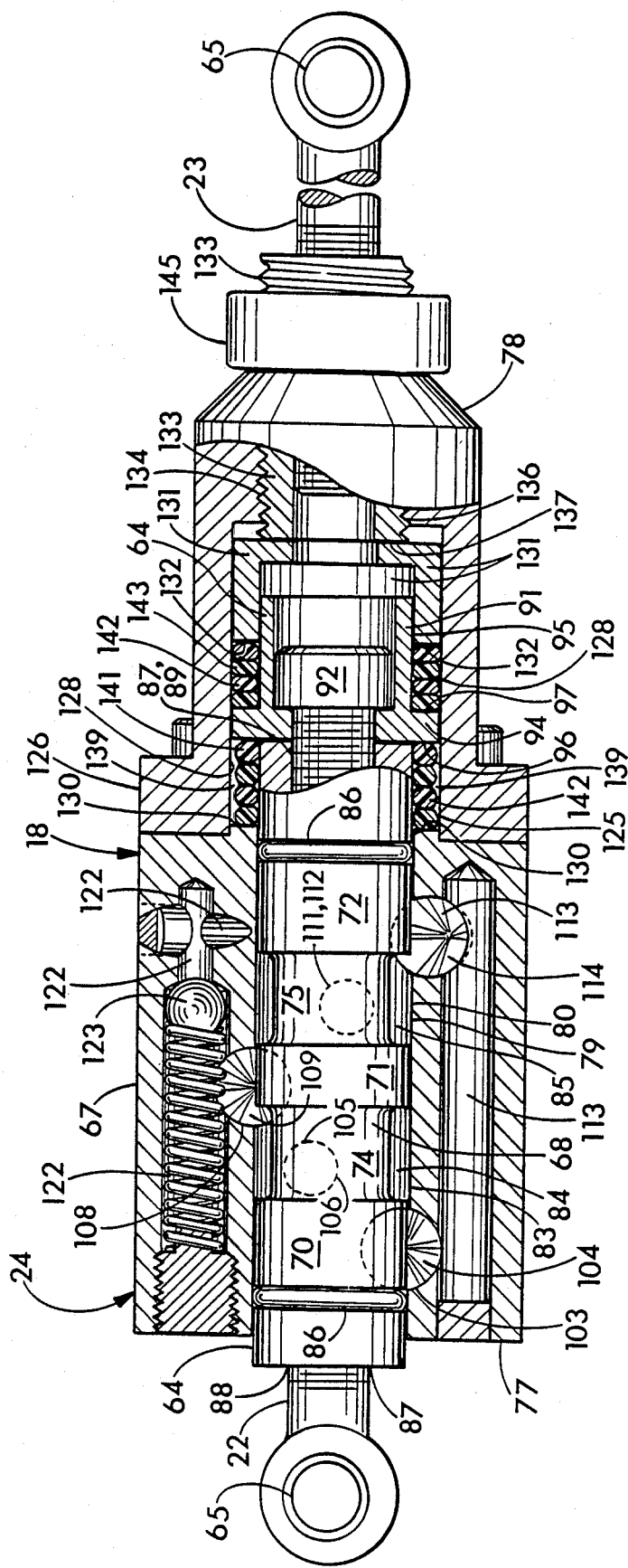
FIG. 12 is a longitudinal section view of the control valve similar to FIG. 11 with the spool pushed forwardly to compress the second set of elastic rings.
Figure 13:
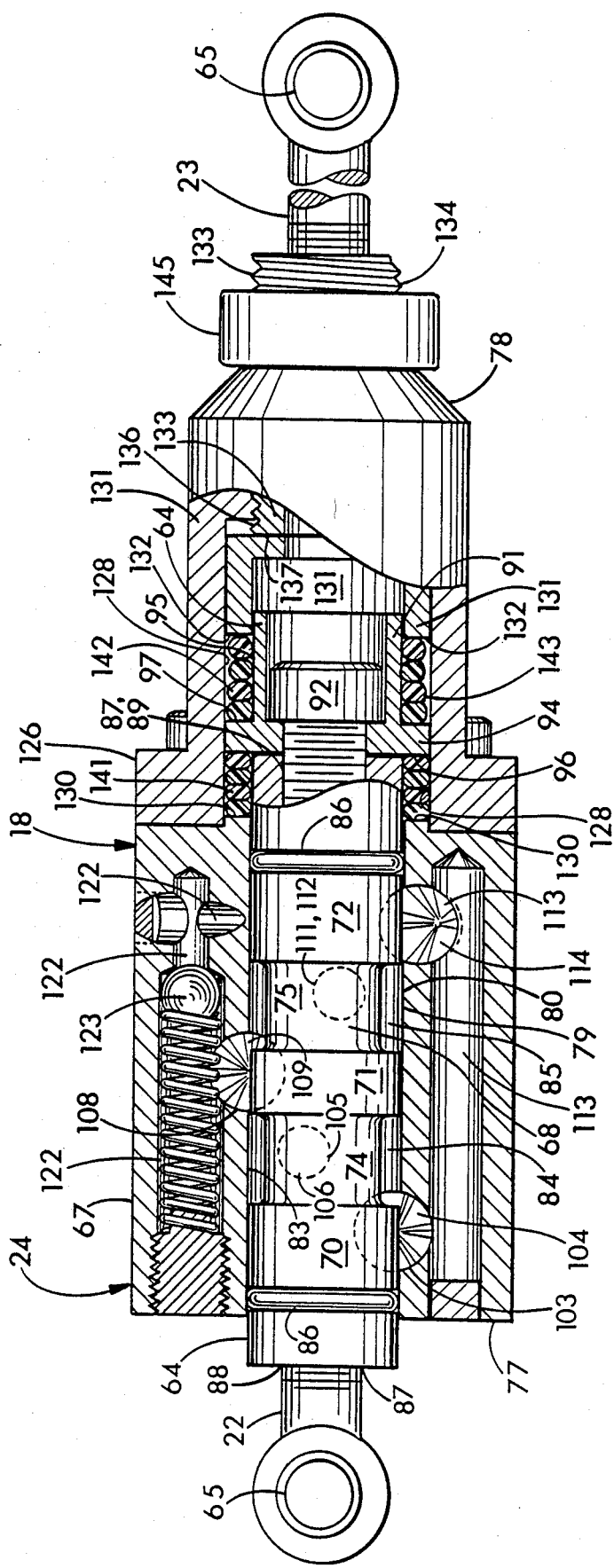
FIG. 13 is a longitudinal section view of the control valve similar to FIG. 11 with the spool pulled rearwardly to compress the first set of elastic rings.
Figure 14:
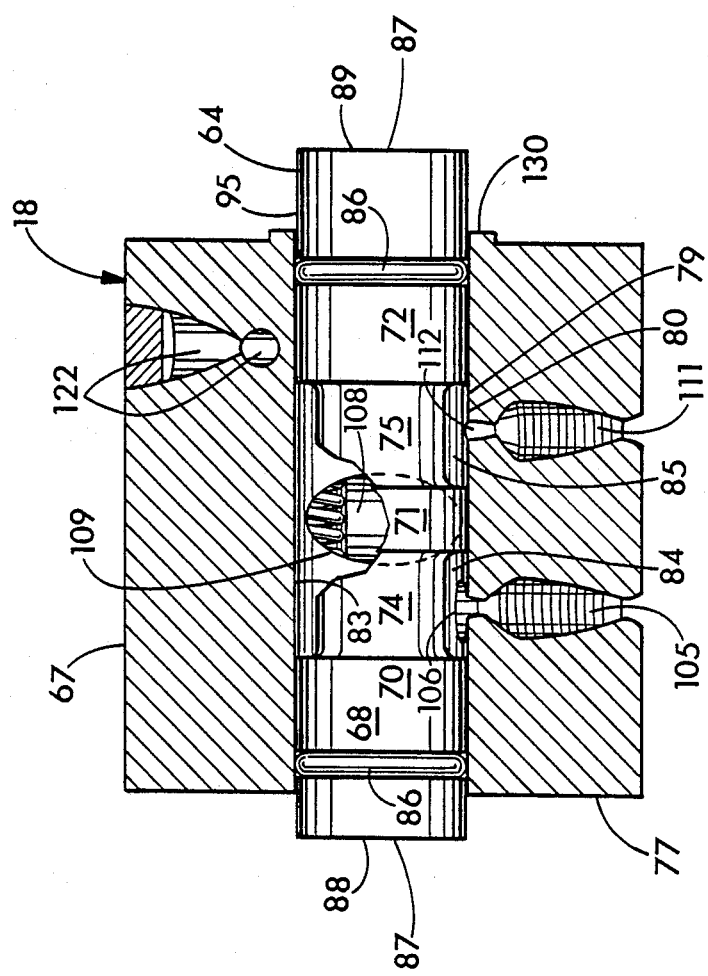
FIG. 14 is a longitudinal section view taken along section line 14—14 of FIGS. 6–10, showing only the control portion of the valve housing.

The four-way, three-position control open center valve 18 includes a valve housing 67, a spool 64 which is axially slidable within the valve housing 67, and means for biasing the spool 64 to its central position and for transmitting tensile and compressive forces through the valve housing 67 and spool 64 so that force can be transmitted from the spool 64 through the spool central biasing and force transmitting means to the valve housing 67, and from the valve housing 67 through the spool central biasing and force transmitting means to the spool 64. A control portion 68 of the spool 64 includes a first, second, and third wide damper portions 70, 71, and 72, a first narrow portion 74 between the first and second wide damper portions 70 and 71, and a second narrow portion 75 between the second and third wide damper portions 71 and 72. The valve housing 67 has a back end 77, a front end 78, and an axial bore 79 which extends longitudinally through the valve housing 67 from the back end 77 to the front end 78. The spool 64 is substantially contained and is axially movable within the axial bore 79 between a rearward position which is shown in FIG. 13, a central position which is shown in FIG. 11, and a forward position which is shown in FIG. 12. Although the control valve 18 is said to be a three-position valve, the spool 64 actually slides between the three positions so that the control the valve 18 provides is continuously variable between those three positions. Therefore, more precise control is obtained by the use of this control valve 18. In the embodiment shown, the control portion 68 of the spool 64 has a spool axial bore 87 which is threaded at the ends 88 and 89 thereof. The rear end 88 of the spool axial bore 87 is threaded so that the connecting portion 22 may be screwed into the bore 87. The front end 89 of the spool central bore 87 is threaded to extend the spool 64 by the attachment of the spool extension 91 with the Allen bolt 92 as shown in FIG. 11. The spool extension 91 includes a flange portion 94 which extends outwardly from the spool outer surface 95 and has a spool rearward facing surface 96 and a spool forward facing surface 97. The control portion 80 of the bore 79 has a diameter which is substantially equal to that of the spool wide damper portions 70, 71, and 72 so that the spool wide damper portions 70, 71, and 72 are in contact with the axial bore inner surface 83. Therefore, substantially no hydraulic fluid is able to pass between the inner surface 83 and the wide damper portions 70, 71, and 72. Located near the ends of the spool control portion 68 are elastic O-rings 86 which prevent leakage of hydraulic fluid from the valve 18. The inner surface 83 of the axial bore control portion 80 and the narrow portions 74 and 75 of the spool 64 together form a first slidable passageway 84 and a second slidable passageway 85. As the spool 64 moves axially within the valve housing 67, the slidable passageways 84 and 85 also move axially, thereby coming into selective communication with the other passageways within the valve housing 67.

Figure 5:
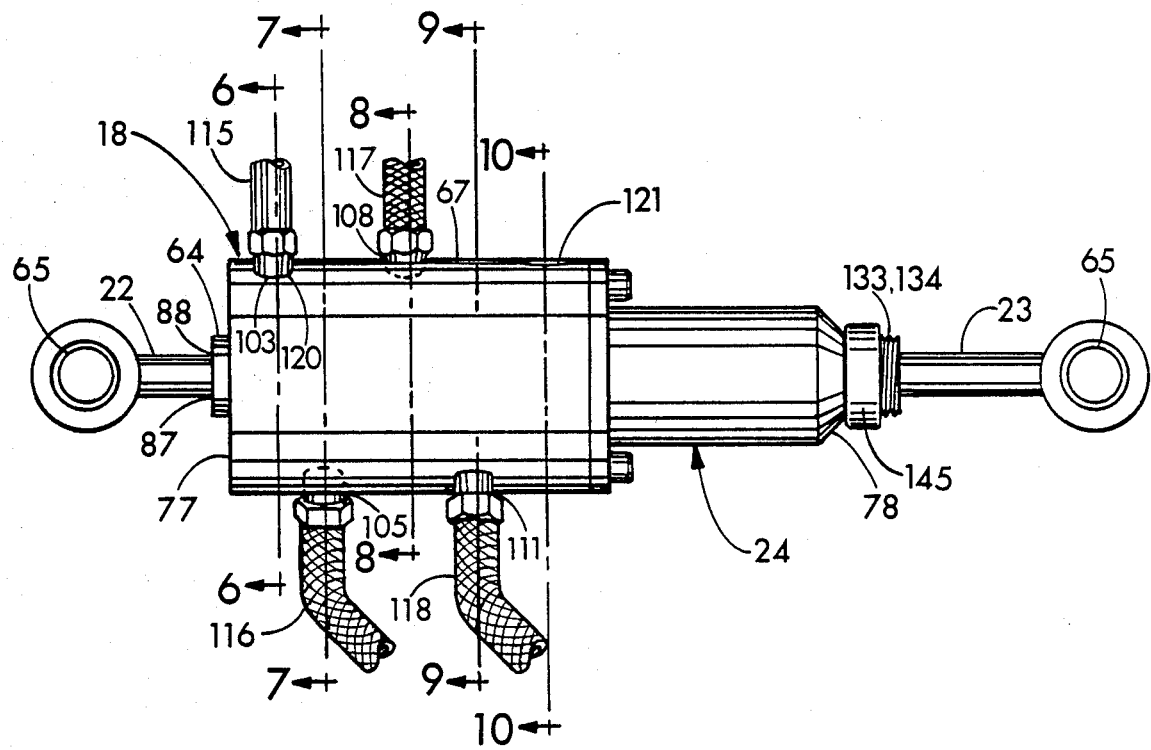
FIG. 5 is a side view of the control valve with attached connecting portions and hoses.
Figure 6:
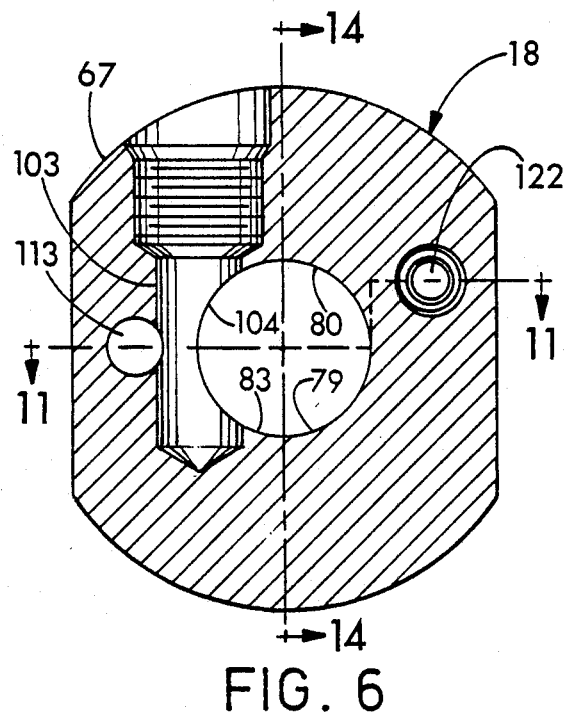
FIG. 6 is a cross-sectional view taken along section 6—6 of FIG. 5.
Figure 7:
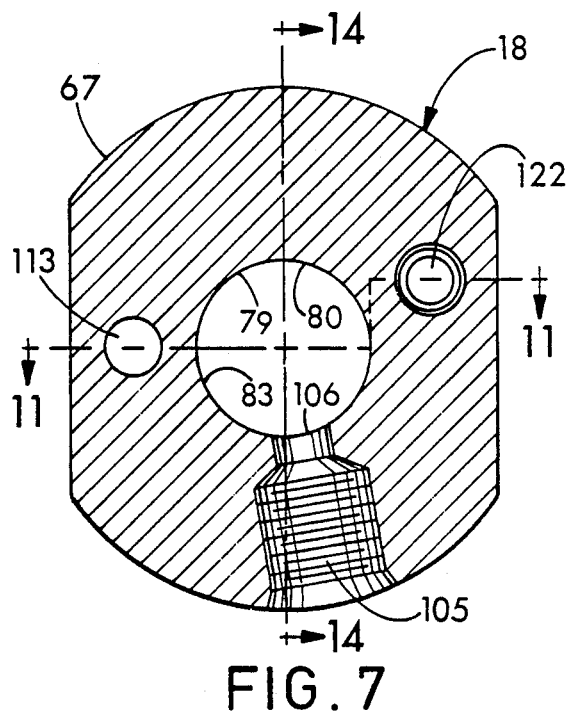
FIG. 7 is a cross-sectional view taken along section 7—7 of FIG. 5.
Figure 8:
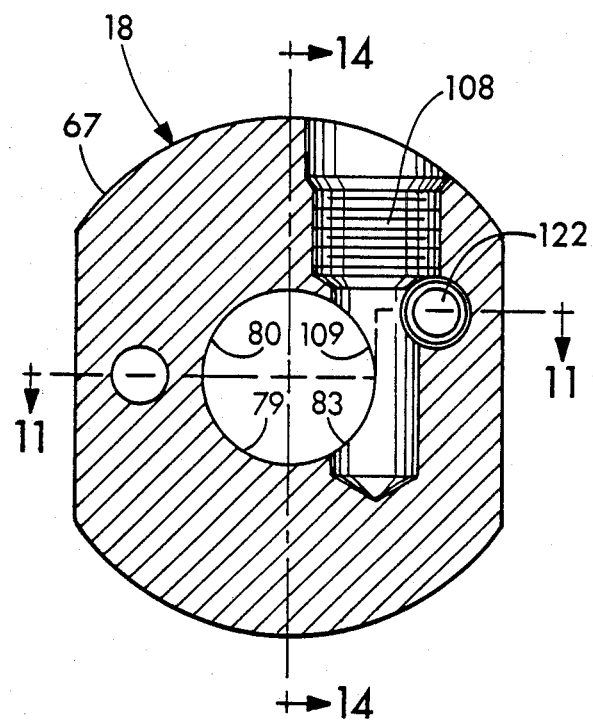
FIG. 8 is a cross-sectional view taken along section line 8—8 of FIG. 5.
Figure 9:
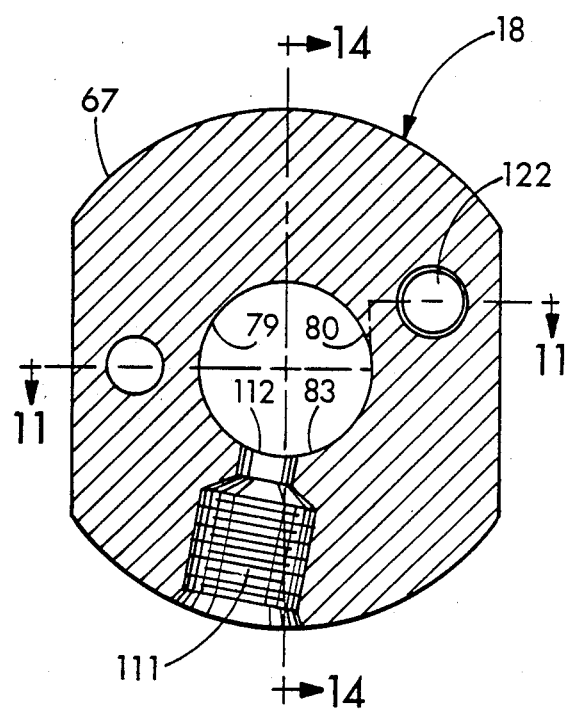
FIG. 9 is a cross-sectional view taken along section line 9—9 of FIG. 5.
Figure 10:
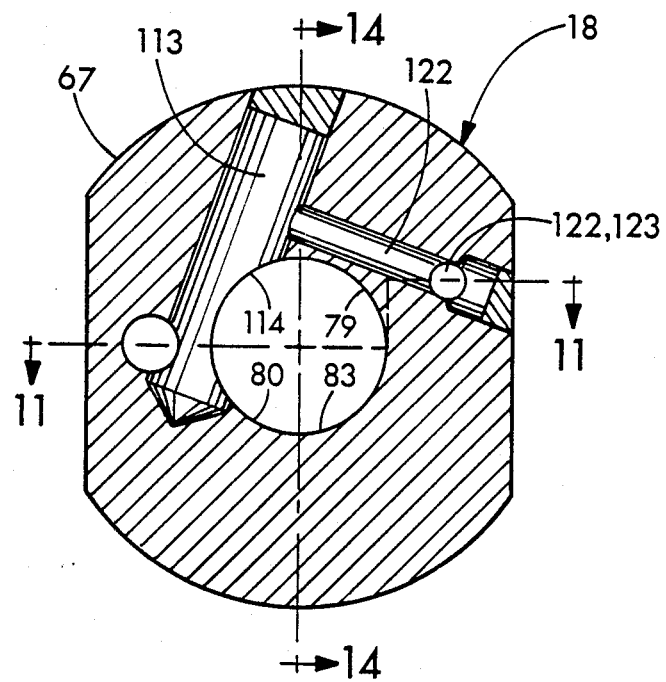
FIG. 10 is a cross-sectional view taken along section line 10—10 of FIG. 5.

The valve housing 67 has five passageways which communicate with the axial bore 79. As shown in FIGS. 5–6 and 11, the valve housing 67 has a first return passageway 103 which communicates with the axial bore 79 in proximity to the spool first wide damper portion 70 through a first return orifice 104, and which is adapted to communicate with the reservoir 15 through a return hose 115. As shown in FIGS. 5, 7 and 11, a first cylinder passageway 105 communicates with the axial bore 79 at the first slidable passageway 84 through a first cylinder orifice 106, and is adapted to communicate with one of the hydraulic cylinder chambers 44 or 45 through a first cylinder hose 116. As shown in FIGS. 5, 8 and 11, the valve housing 67 has a pressure passageway 108 which is located forwardly from the first cylinder passageway 105 and which is adapted to communicate with the hydraulic pump 16 by way of the pressure hose 117. The pressure passageway 108 communicates with the axial bore 79 in proximity to the spool second wide damper portion 71 through a pressure orifice 109. A second cylinder passageway 111 is located forwardly from the pressure passageway 108 and is adapted to communicate with another of the hydraulic cylinder chambers 44 or 45 through the second cylinder hose 118 as shown in FIGS. 5, 9 and 11. The second cylinder passageway 111 communicates with the axial bore 79 at the second slidable passageway 85 through a second cylinder orifice 112. A second return passageway 113 is located forwardly from the second cylinder passageway 111 and is adapted to communicate with the reservoir 15 through the return hose 115 as shown in FIGS. 5, 10 and 11. The second return passageway 113 communicates with the axial bore 79 in proximity to the spool third wide damper portion 72 through a second return orifice 114.

In all three positions of the spool, each of the cylinder passageways 15 and 111 are always in communication with one of the slidable passageways 84 and 85 as shown in FIGS. 11–13. Depending upon the position of the spool 64, each of the slidable passageways 84 and 85 may communicate with one of the return passageways 103 and 113 and/or the pressure passageway 108. When the spool 64 is in its rearward position, several things occur, as shown in FIG. 13. First of all, hydraulic pressure is directed from the pressure passageway 108 through the second slidable passageway 85 to the second cylinder passageway 111 to pressurize one of the hydraulic cylinder chambers 44 or 45. Secondly, the spool third wide damper portion 72 blocks hydraulic pressure from entering the second return passageway 113 from the second slidable passageway 85 to ensure that it is all directed into the pressurized cylinder chamber 44 or 45. Thirdly, hydraulic fluid is exhausted from the first cylinder passageway 105 through the first slidable passageway 84 to the first return passageway 103, so that the other cylinder chamber 44 or 45 is exhausted. Fourthly, the spool second wide damper portion 71 blocks hydraulic pressure from entering the first slidable passageway 84 from the pressure passageway 108.

When the spool 64 is in its central position, in the control valve 18 shown in FIG. 11, hydraulic pressure is directed from the pressure passageway 108 equally to both slidable passageways 84 and 85. The hydraulic fluid is then drained to reservoir 15 through both return passageways 103 and 113. Both chambers 44 and 45 of the hydraulic cylinder 19 are pressurized equally. Other embodiments of the control valve may vary in what occurs when the spool is in its central position. Several alternative valve embodiments will be discussed later. In all of these embodiments, the hydraulic pressure, if any, which enters the cylinder passageways 105 and 111 to the cylinder chambers 44 and 45 must be equal so the cylinder end rod 42 tends to remain stationary when the spool is in its central position.

When the spool 64 is in its forward position, several things occur as shown in FIG. 12. First of all, hydraulic pressure is directed from pressure passageway 108 through the first slidable passageway 84 to the first cylinder passageway 105 to pressurize any cylinder chamber 44 or 45 which is connected to the first cylinder passageway 105. Secondly, the spool first wide damper portion 70 blocks hydraulic pressure from entering the first return passageway 103 from the first slidable passageway 84 so that the hydraulic pressure must enter the first cylinder passageway 105. Thirdly, hydraulic fluid is exhausted from the second cylinder passageway 111 through the second slidable passageway 85 to the second return passageway 113. In this manner, any cylinder chamber 44 or 45 which is connected to the second cylinder passageway 111 is exhausted. Fourthly, the spool second wide damper portion 71 blocks hydraulic pressure from entering the second slidable passageway 85 from the pressure passageway 108.

To obtain a very smooth and accurate control of movement of the cylinder end rod, it is preferred that the return orifices 104 and 114, and pressure orifice 109 be ellipsoidal in shape with their minor axes parallel to the axis of the spool 64 as shown in FIGS. 6, 8, 10 and 14. If the pressure orifice 109 is ellipsoidal, relatively little axial movement of the spool 64 from its central position is required to block a flow of hydraulic fluid from the pressure passageway 108 into one of the slidable passageways 84 or 85. When the return orifices 104 and 114 are ellipsoidal with their minor axes parallel to the axis of the spool, relatively little axial movement of the spool 64 from its central position is required to block the flow of hydraulic fluid from one of the slidable passageways 84 or 85 into the adjacent return passageway 103 or 113. As a spool wide damper portion 70 or 72 moves across an ellipsoidal orifice 104 or 114 to close it, the orifice is progressively closed off or opened. The second wide damper portion 71 never completely closes the pressure orifice 109, but directs hydraulic pressure into either of the slidable passageways 84 or 85, or into both when centered.

It is preferred that the first and second return passageways 103 and 113 connect to communicate with one another and the reservoir 15 so that only one return hose 115 is required to the reservoir as shown in FIGS. 5 and 11. Alternatively, the return hose 115 could be connected to the hole 121 and the hole 120 plugged. It is preferred that the valve housing 67 have a conduit 122 which extends between the pressure passageway 108 and one of the return passageways. In this case the conduit 122 is connected to the second return passageway 113 as shown in FIGS. 8, 10, and 11. The conduit 122 has a check valve 123 which prevents flow from the pressure passageway into the return passageways 103 and 113, but which when the source of hydraulic pressure is not operating, allows flow from the return passageways 103 and 113 into the pressure passageway 108. This conduit 122 and check valve 123 allows hydraulic fluid to pass through the valve 24 between the cylinder passageways 105 and 111, and therefore from one cylinder chamber to another, so that the steering system can be operated manually when the pump 16 is not functioning. Additionally, the conduit 122 and check valve 123 allows the skis 31 to be turned manually with the steering column 32 at a speed which exceeds the capabilities of the power steering system. Without the conduit 122 and check valve 123, the operator would have to push against the pressure of the hydraulic fluid which would be retained within the hydraulic cylinder chambers 44 and 45. If desired, the conduit 122 and check valve 123 could be located outside of the valve housing 67, as shown schematically in FIG. 4. Preferably, however, the conduit 122 is formed within the valve housing 67 as shown in FIGS. 8, 10, and 11.

A biasing portion 125 of the axial bore 79 is located within a biasing portion 126 of the valve housing 67 as shown in FIG. 11. The axial bore biasing portion 125 has a diameter larger than that of the spool outer surface 95 so that an inner surface 128 of the axial bore biasing portion 125 is spaced outwardly from the spool 64. The valve housing 67 includes a housing forward facing surface 130 where the control portion 80 and biasing portion 125 of the axial bore 79 join. The control valve 18 includes a sleeve 131 located within the axial bore biasing portion 125. The sleeve 131 is maintained in a fixed position with relation to the housing 67 by an adjusting collet 133 having a threaded outside surface 134. The forward end 136 of the axial bore 79 is threaded so that the adjusting collet 133 may be screwed into the threaded portion 136 of the axial bore 79. When screwed therein, the adjusting collet 133 is located forwardly from the sleeve 131 and has rearward end 137 which abuts against the sleeve 131 to maintain the sleeve 131 in its fixed relation to the housing 67. The sleeve 131 includes what is called the housing rearward facing surface 132. The axial bore biasing portion inner surface 128, the housing forward facing surface 130, the housing rearward facing surface 132, and the spool outer surface 95 together form an annular space 139. The flange portion 94 of the spool 64 extends outwardly from the spool outer surface 95 centrally into the annular space 139 when the spool 64 is in its central position as shown in FIG. 11. The spool rearward facing surface 96 opposes the housing forward facing surface, and the spool forward facing surface opposes the housing rearward facing surface. A first set 141 of four elastic O-rings 142 is contained within the annular space 139 between the housing forward facing surface 130 and the spool rearward facing surface 96 on the flange portion 94. A second set 143 of four elastic O-rings 142 is located within the annular space 139 between the spool forward facing surface 97 on the spool flange portion 94, and the housing rearward facing surface 132 on the sleeve 131. Rearward movement of the spool 64 from its central position compresses the first set 141 of the elastic O-rings 142 to bias the spool 64 back toward its central position and to transmit a tensile force through the housing 67 and the spool 64 as shown in FIG. 13. Forward movement of the spool 64 from its central position compresses the second set 143 of elastic O-rings 142 to bias the spool 64 back toward its central position and to transmit a compressive force through the housing 67 and the spool 64 as shown in FIG. 12. Thus, the entire selected connecting rod 24 is able to transmit both tensile and compressive forces.

The adjusting collet 133 may be turned to adjust the axial position of the sleeve 131. Axial adjustment of the position of the sleeve 131 must position the second widened damper portion 71 centrally over the ellipsoidal pressure orifice 109 when the spool 64 is in its central position. Once the sleeve 131 is adjusted to its desired position, a lock nut 145 may be screwed over the adjusting collet 133 to abut against the front end 78 of the valve housing 67. The lock nut 145 locks the adjusting collet 133 and sleeve 131 in the desired position. The rings 142 exhibit a very low frequency rate, which tends to dampen the effect of the oscillations of the skis 31. By changing the number of rings 142, their size and shape, their preloaded compression as determined by the position of the adjusting collet 133, or any combination thereof, the power steering can be adjusted to provide either more or less power assist to aid driver effort.

The spool central biasing and force transmitting means may vary in several respects and not depart from the spirit of the invention. Usually, such alternative embodiments will include a spool rearward facing surface which moves axially with axial movement of the spool, a housing forward facing surface which is in fixed relation to the housing and is in opposition to the spool rearward facing surface, a spool forward facing surface which moves axially with axial movement of the spool, a housing rearward facing surface which is maintained in a fixed relation to the housing and is in opposition to the spool forward facing surface, and at least one elastic member between those surfaces which are in opposition to each other. For example, a hollow could be formed in the valve housing so that the housing would have the housing forward and rearward facing surfaces. Another hollow could be formed in the spool radially inwardly from the housing hollow and opening toward the housing hollow when the spool is in its central position. The hollow in the spool could be formed so that the spool would have the spool forward facing surface and spool rearward facing surface. The spool hollow together with the housing hollow would form a space into which an elastic member could be placed, the elastic member being shaped in the shape of the space. Any axial movement of the spool away from its central position would cause the elastic member to be pinched and compressed by the opposing surfaces on the valve housing and spool. The spool, therefore, would be biased to return to the central position. The elastic member and opposing surfaces would allow tensile and compressive forces to pass between the spool and valve housing. Also, in alternative embodiments, it might not be necessary that the valve housing axial bore 79 extend all the way to the front end 78 of the valve housing 67. In such alternative embodiments, means other than the sleeve 131 and adjusting collet 33 might be necessary to adjust the tightness of the elastic members.

Although the control valve 18 shown schematically in FIG. 4 is a four-way, three-position open center control valve 18 which allows the pump to continue to pump hydraulic fluid to the reservoir 15 when the spool is in its central position, the spool could be varied so that the control valve operates differently when the spool 64 is in its central position. In FIGS. 4a–4d, alternative valves 147, 148, 149, and 150 are shown schematically. All of the valves 147, 148, 149, and 150 operate substantially identically to the control valve 18 when their spools are in either the rearward position or forward position. The control valve 147 shown in FIG. 4a is known in the art as a four-way, three-position control valve in which the reservoir passageway is blocked, and the cylinder passageways are in communication with the pressure passageway when the spool is in its central position. The centered spool therefore blocks hydraulic fluid flow from the pump to the reservoir when the spool is centered, but pressurizes both chambers of a connected hydraulic cylinder equally. FIG. 4b shows schematically a four-way, three-position control valve 148 in which the pressure passageway is blocked when the spool is in its central position. Additionally, both cylinder passageways are in communication with the reservoir passageways when the spool is centered. FIG. 4c shows what is known in the art as a four-way, three-position blocked center control valve 149. When the spool is in its central position, it blocks the cylinder passageways, the pressure passagway, and the return passageways to the reservoir. FIG. 4d shows what is known in the art as a four-way, three-position, tandem center control valve 150. When the spool is in its central position, the cylinder passageways are blocked but hydraulic fluid is allowed to flow from the pressure passageway to the return passageway. Therefore the spool, when centered, allows the pump to unload hydraulic fluid to the reservoir. It would be preferred that the alternative control valves 147, 148, 149, and 150 include the spool central biasing and force transmitting means disclosed herein, the ellipsoidal passageways, and the conduit and check valve which allow the power steering system to be operated manually when the pump 16 is non-functional, or when the speed of turning exceeds the capabilities of the power steering.

The selected connecting rod 24 may vary in its embodiment and still be considered as part of the present invention. For example, the two connecting portions 22 and 23 could be joined together by an elastic piece which would compress or stretch depending on the forces which the connecting portions 22 and 23 place on it. The elastic pieces and connecting portions 22 and 23 together might have the appearance of a connecting rod. The control valve then could be located to the side where extensions from each of the connecting portions would connect to the valve to operate the valve as the connecting portions in combination with the elastic piece vary in length.

Conventional steering systems in various types of snowmobiles may be retrofitted with the hydraulic system 20 shown in FIG. 4. In each of the embodiments shown in FIGS. 1–3, one of the connecting rods between the steering arm pivotal member and ski arm pivotal members was taken out of a conventional manual steering system and replaced by the selected connecting rod 24, which includes the control valve 18 and the connecting portions 22 and 23. Also, the hydraulic cylinder was mounted to the snowmobile chassis 30, and the cylinder end rod 42 was pivotally connected to the linkage arrangement 26, 27, or 28 to assist the steering column 32. The reservoir 15, hydraulic pump 16, control valve 18, and hydraulic cylinder 19 were connected together with hoses in accordance with FIGS. 4 and 5.

In its operation, the snowmobile power steering system shown in FIGS. 1–4 is intended to be used in snowmobiles to make the steering of the snowmobile easier for the operator. FIG. 1 shows the first preferred embodiment of the snowmobile power steering system 10 making a right turn. The steering column 32 is turned rightwardly, thereby transmitting a compressive force to the selected connecting rod 24 through the steering arm pivotal member 39. This compressive force causes the pivotal plate member 34 to be rotated counter-clockwise. This counter-clockwise motion causes the steering connecting rods 36 to move leftwardly, thereby causing the ski arm pivotal members 35 to turn clockwise. The clockwise motion of the ski arm pivotal members 35 causes the skis to rotate to the right. Any rotation of the skis caused by rotation of the steering column 32 which causes the selected connecting rod 24 to be in tension is defined to be a rotation "in the first direction". Any rotation of the skis caused by the steering column 32 which places the selected connecting rod 24 in compression is defined to be a rotation "in the second direction". Since the rightward turn of the skis in FIG. 1 by the steering column 32 causes the selected connecting rod 24 to be in compression, this rightward turn is considered to be a turn "in the second direction". Since the selected connecting rod 24 is compressed, the spool 64 is moved forwardly from its central position in the axial bore 79. Hydraulic pressure is directed to the pressure passageway 108 through the first slidable passageway 84 to the first cylinder passageway 105 where it is directed through the first cylinder hose 116 shown in FIG. 5 to the hydraulic cylinder chamber 45 shown in FIG. 1. Hydraulic fluid in cylinder chamber 44 is exhausted through the second cylinder hose 118 shown in FIG. 5 and through the second cylinder passageway 111 and second slidable passageway 85 to the second return passageway 113. Hydraulic fluid is then conducted through the return hose 115 shown in FIG. 5 to the reservoir 15. The pressurization of cylinder chamber 45 and exhausting of cylinder chamber 44 causes the end rod 42 to be retracted thereby imposing an additional counter-clockwise torque on the pivotal plate member 34 which assists the operator in making the right turn. Once the skis 31 reach their desired right turn position, the operator ceases to apply a torque to the steering column 32. Therefore, the selected connecting rod 24 no longer is placed in compression and the spool 64 returns to its central position, thereby equalizing the hydraulic pressure which is supplied to cylinder chambers 44 and 45. The hydraulic cylinder end rod 42 ceases to apply a torque on the pivotal plate member 34, and hence, the skis 31 remain in their desired rightward turn position. If one of the skis 31 hits a bump which drives the skis slightly to the left, the force of the bump is transmitted through the linkage arrangement 26 as a compressive force to the selected connecting rod 24. The spool 64 again moves forwardly so that hydraulic pressure is directed to the cylinder chamber 45 and exhausted from the cylinder chamber 44 thereby again causing the cylinder end rod 42 to be retracted. The pivotal plate member 34 is rotated by the cylinder 19 until the skis 31 are returned to their desired rightward turn position. If the skis 31 are bumped so that they turn too far to the right, the selected connecting rod is placed in tension so that the spool 64 is moved rearwardly. The control valve 18 then directs hydraulic pressure to the cylinder chamber 44 and exhausts hydraulic fluid from cylinder chamber 45 so that the cylinder end rod 42 is extended, thereby causing the pivotal plate member 34 to be rotated clockwise. The counter-clockwise movement of the pivotal plate member 34 causes the skis 31 to be returned leftwardly to their correct left turn position. Thus, the snowmobile power steering system is able to return the skis 31 to their desired position when the skis are jarred from that position. The majority of the force which corrects the positioning of the skis will be exerted by the hydraulic cylinder 19, and not y the snowmobile operator through the steering column 32. With the present invention, the operator will be required to exert much less force to respond to bumps which the skis 31 hit, and the steering therefore will be much smoother.

If a leftward turn of the skis 31 were made in the first preferred embodiment of the snowmobile steering system shown in FIG. 1, the counter-clockwise torque in the steering column 32 would place the selected connecting rod 24 in tension thereby causing the pivotal plate member 34 to turn clockwise. The clockwise rotation of the pivotal plate member 34 would move the steering connecting rods 36 to the right, thereby causing the ski arm pivotal members 35 to be turned counter-clockwise. The counter-clockwise rotation of the extended arm pivotal members 35 rotates the skis 31 leftwardly. Additionally, since the selected connecting rod 24 is placed in tension, the spool 64 in the control valve 18 moves rearwardly from its central position. Hydraulic pressure is directed from the pump 16 through the pressure passageway 108 through the second slidable passgeway 85 to the second cylinder passageway 111. The hydraulic pressure passes from the second cylinder passageway 111 through the second cylinder hose 118 shown in FIG. 5 to the hydraulic cylinder chamber 44. Hydraulic fluid is exhausted from cylinder chamber 45 through the first cylinder hose 116 shown in FIG. 5 to the first cylinder passageway 105 where the hydraulic fluid is conducted through the first slidable passageway 84 to the first return passageway 103 and through the return hose 115 to reservoir 15. The pressurization of hydraulic cylinder chamber 44 and exhaustion of cylinder chamber 45 causes the cylinder end rod 42 to be extended, thereby placing a torque on the pivotal plate member 34 which causes the pivotal plate member 34 to be turned clockwise. This clockwise torque on the pivotal plate member 34 assists the operator in turning the skis 31 leftwardly. Again, when the skis reach their desired leftward turn position, the tension in the selected connecting rod 24 ceases, and the spool 64 returns to its central position so that the pressurization of cylinder chambers 44 and 45 are equalized. The skis 31 therefore remain in their desired leftward turn position. Correction of any deflection of the skis from their desired leftward turn position is accomplished in the same manner as described above. Bumps which drive the skis too far to the left place the selected connecting rod 24 in compression and move the spool forwardly so that cylinder chamber 45 is pressurized and cylinder chamber 45 is exhausted. The cylinder end rod 42 is retracted so that the pivotal plate member 34 receives a counter-clockwise torque which moves the skis rightwardly back to their desired leftward turn position. If the skis 31 are deflected to the right of the desired leftward turn position, the pivotal plate member 34 is rotated counter-clockwise so that the selected connecting rod 24 is placed in tension and the spool 64 is moved rearwardly in the axial bore 79. The control valve 18 thus directs hydraulic pressure to the hydraulic cylinder chamber 44 and exhausts hydraulic fluid from cylinder chamber 45, thereby causing the cylinder end rod 42 to be extended. The extension of end rod 42 places a clockwise torque on the pivotal plate member 34 which causes the skis 31 to move leftwardly back to their desired leftward turn position. When the skis 31 are returned to their desired position, the selected connecting rod 24 ceases to be in tension and the spool 64 is returned to its central position where the hydraulic pressure is directed to cylinder chambers 44 and 45 equally so that the skis 31 remain in their desired position.

The second preferred embodiment of the snowmobile steering system 11 shown in FIG. 2 functions quite similarly to that shown in FIG. 1. When the steering column 32 is turned to the right, the force is transmitted through the linkage arrangement 27 to the skis 31 which are rotated to the right. The selected connecting rod 24 is placed in compression so that hydraulic pressure is directed to hydraulic cylinder chamber 45, and hydraulic fluid is exhausted from cylinder chamber 44, thus causing the cylinder end rod 42 to be retracted. This retraction of the cylinder end rod 42 provides an additional assist in the steering system to rotate the skis 31 to the right. Since the selected connecting rod 24 is placed in compression on rightward turns, rightward turns are defined to be turns "in the second direction". When the steering column 32 is turned to the left, the linkage arrangement 27 transmits the force to the skis 31 to turn the skis to the left. As the steering column 32 is turned to the left, the selected connecting rod 24 is placed in tension, thereby causing the control valve 18 to direct hydraulic pressure to hydraulic cylinder chamber 44 and to exhaust hydraulic fluid from cylinder chamber 45. A left turn is therefore "in the first direction". The cylinder end rod 42 is extended, causing the skis 31 to be turned leftwardly. In a turn in either direction, the skis 31 rotate only until they reach their desired leftward or rightward position. When the skis' 31 desired position is reached, the steering column 32 ceases to exert any compressive or tensile force on the selected connecting rod 24, so that the spool 64 returns to its central position. Thus, once the skis 31 are in their desired position, the hydraulic pressure directed to the cylinder chambers 44 and 45 is equalized and movement of the skis 31 stops. If the skis 31 are bumped to the right of their desired position, the selected connecting rod 24 is placed in tension, and the control valve 18 directs hydraulic pressure to hydraulic cylinder chamber 44 and exhausts cylinder chamber 45 until the skis 31 return to their desired position. Similarly, if the skis are bumped leftwardly from their desired position, the selected connecting rod 24 is placed in compression. The control valve 18 then directs hydraulic pressure to hydraulic cylinder chamber 45 and exhausts hydraulic fluid from cylinder chamber 44 until the skis 31 are returned to their desired position.

When the steering column 32 of the third preferred embodiment of the snowmobile power steering system 12 shown in FIG. 3 is rotated to the right, force is transmitted through the linkage arrangement 28 to turn the skis 31 rightwardly. Additionally, the selected connecting rod 24 is placed in tension so the spool 64 is moved rearwardly within the axial bore 79. Thus, a rightward turn in the third embodiment 12 is considered to be a turn "in the first direction". The control valve 18 directs hydraulic pressure to hydraulic cylinder chamber 44 and exhausts hydraulic fluid from cylinder chamber 45 to extend the cylinder end rod 42. This extension of the cylinder end rod 42 causes the steering connecting rod 62 to be moved rightwardly, thus causing the skis 31 to be moved to the right as well. As in the other embodiments, this rightward movement only occurs until the skis move to their desired right turn position and the spool 64 is returned to its central position. When the steering column 32 is turned to the left, force is transmitted through the linkage arrangement 28 to the skis 31 to turn the skis 31 to the left. At the same time, selected connecting rod 24 is placed in compression and thus the control valve 18 directs hydraulic pressure to hydraulic cylinder chamber 45 and exhausts hydraulic fluid from cylinder chamber 44. The cylinder end rod 62 is retracted and thereby provides additional force for moving the steering connecting rod 62 leftwardly to rotate the skis 31 leftwardly. If the skis are bumped rightwardly from their desired position, the selected connecting rod 24 is placed in compression so that the control valve 18 directs hydraulic pressure to hydraulic cylinder chamber 45 and exhausts cylinder chamber 44 until the correction is made. Similarly, if the skis 31 are bumped to the left of the desired course, the selected connecting rod 24 is placed in tension and the control valve 18 directs hydraulic pressure to the hydraulic cylinder chamber 44 and exhausts cylinder 45 until the position of the skis is corrected.

The snowmobile power steering system disclosed herein functions to reduce the effort required from the snowmobile operator in steering the snowmobile, and provides for smoother operation of the steering system. Additionally, the power steering system allows for and corrects slight deflections of the skis which are caused by the skis being bumped sidewardly. The snowmobile power steering system disclosed herein also reduces the effects on the steering system of any vibrations produced by oscillations in the skis.

It is understood that the invention is not confined to the particular construction and arrangement herein illustrated and described, but embraces such modified forms thereof as come within the scope of the following claims.

What is claimed is:

1. A power steering system for steering a snowmobile having a body with a chassis, and a pair of laterally spaced steerable skis, the power steering system comprising:
   (a) a source of hydraulic pressure including a reservoir for storing hydraulic fluid;
   (b) a hydraulic cylinder which is mounted to the snowmobile body and has two chambers and at least one end rod;
   (c) a steering column; and
   (d) a linkage arrangement including interconnected connecting rod and pivotal members which together transmit force from the steering column to the skis to selectively rotate the skis, wherein a selected connecting rod transmits a tensile force when the skis are being rotated in a first direction by force transmitted from the steering column, and a compressive force when the skis are being rotated in a second direction by force transmitted from the steering column, the linkage arrangement being operably connected to the hydraulic cylinder end rod so that movement of the end rod rotates the skis; and wherein the selected connecting rod includes a control valve means for selectively directing hydraulic pressure to a hydraulic cylinder chamber to move the end rod so the skis rotate in the first direction when the selected connecting rod transmits a tensile force and for selectively directing hydraulic pressure to the other hydraulic cylinder chamber to move the end rod so the skis rotate in the second direction when the selected connecting rod transmits a compressive force, the hydraulic cylinder thereby augmenting the force transmitted to the linkage arrangement by the steering column;

wherein the linkage arrangement comprises;
   (i) a pivotal plate member which is pivotally connected to the chassis;
   (ii) a steering arm pivotal member which is rigidly connected to the steering column;
   (iii) two ski arm pivotal members which are each in association with a ski such that rotation of the ski arm pivotal member causes rotation of the associated ski;
   (iv) two steering connecting rods, each being pivotally connected at one end to the pivotal plate member and at another end to a ski arm pivotal member so that rotation of the plate member in a first direction causes the skis to rotate in a first direction, and rotation of the plate member in a second direction causes the skis to rotate in a second direction; and
   (v) said selected connecting rod being pivotally connected to the steering arm pivotal member and pivotal plate member so that rotation of the steering column which places the selected connecting rod in tension causes the pivotal plate member to rotate in the first direction, and rotation of the steering column which places the selected connecting rod in compression causes the pivotal plate member to rotate in the second direction; wherein the hydraulic cylinder at one end is pivotally connected to the snowmobile chassis, and from another end extends the end rod which is pivotally connected to the pivotal plate member.

2. A power steering system for steering a snowmobile having a body with a chassis, and a pair of laterally spaced steerable skis, the power steering system comprising:

(a) a source of hydraulic pressure including a reservoir for storing hydraulic fluid;
(b) a hydraulic cylinder which is mounted to the snowmobile body and has two chambers and at least one end rod;
(c) a steering column; and
(d) a linkage arrangement including interconnected connecting rod and pivotal members which together transmit force from the steering column to the skis to selectively rotate the skis, wherein a selected connecting rod transmits a tensil force, when the skis are being rotated in a first direction by force transmitted from the steering column, and a compressive force when the skis are being rotated in a second direction by force transmitted from the steering column, the linkage arrangement being operably connected to the hydraulic cylinder end rod so that movement of the end rod rotates the skis; and wherein the selected connecting rod includes a control valve means for selectively directing hydraulic pressure to a hydraulic cylinder chamber to move the end rod so the skis rotate in the first direction when the selected connecting rod transmits a tensile force and for selectively directing hydraulic pressure to the other hydraulic cylinder chamber to move the end rod so the skis rotate in the second direction when the selected connecting rod transmits a compressive force, the hydraulic cylinder thereby augmenting the force transmitted to the linkage arrangement by the steering column;
wherein the linkage arrangement comprises:
(i) a steering shaft pivotal member which is rotatably mounted to the chassis;
(ii) a forward shaft arm pivotal member which is rigidly connected to a front end of the steering shaft pivotal member;
(iii) a rearward shaft arm pivotal member which is rigidly connected to a back end of the steering shaft pivotal member;
(iv) a steering arm pivotal member which is rigidly connected to the steering column;
(v) two ski arm pivotal members which are each in association with a ski such that rotation of the ski are pivotal member causes rotation of the associated ski;
(vi) two steering connecting rods, each being pivotally connected at one end to the forward shaft pivotal member and at another end to a ski arm pivotal member so that rotation of the steering shaft pivotal member in a first direction causes the skis to rotate in a first direction, and rotation of the steering shaft pivotal member in a second direction causes the skis to rotate in a second direction; and
(vii) said selected connecting rod being pivotally connected to the steering arm pivotal member and rearward shaft arm pivotal member so that rotation of the steering column which places the selected connecting rod in tension causes the steering shaft pivotal member to rotate in the first direction, and rotation of the steering column which places the selected connecting rod in compression causes the steering shaft pivotal member to rotate in the second direction; wherein the hydraulic cylinder at one end is pivotally connected to the snowmobile chassis, and from another end extend the end rod which is pivotally connected to the rearward shaft arm pivotal member.

3. A power steering system for steering a snowmobile having a body with a chassis and a pair of laterally spaced steerable skis, the power steering system comprising:
(a) a source of hydraulic pressure including a reservoir for storing hydraulic fluid;
(b) a hydraulic cylinder which is mounted to the snowmobile body and has two chambers and at least one end rod;
(c) a steering column; and
(d) a linkage arrangement including interconnected connecting rod and pivotal members which together transmit force from the steering column to the skis to selectively rotate the skis, wherein a selected connecting rod transmits a tensile force when the skis are being rotated in a first direction by force transmitted from the steering column, and a compressive force when the skis are being rotated in a second direction by force transmitted from the steering column, the linkage arrangement being operably connected to the hydraulic cylinder end rod so that movement of the end rod rotates the skis; and wherein the selected connecting rod includes a control valve means for selectively directing hydraulic pressure to a hydraulic cylinder chamber to move the end rod so the skis rotate in the first direction when the selected connecting rod transmits a tensile force and for selectively directing hydraulic pressure to the other hydraulic cylinder chamber to move the end rod so the skis rotate in the second direction when the selected connecting rod transmits a compressive force, the hydraulic cylinder thereby augmenting the force transmitted to the linkage arrangement by the steering column;
wherein the linkage arrangement comprises:
(i) a first ski arm pivotal member which is in association with one ski such that rotation of the first ski arm pivotal member causes rotation of the associated ski;
(ii) a steering arm pivotal member which is rigidly connected to the steering column;
(iii) two second ski arm pivotal members which are each in association with a ski such that rotation of the second ski are pivotal member causes rotation of the associated ski and conversely;
(iv) a steering connecting rod which at one end is pivotally connected to one of the second ski arm pivotal members and at another end is pivotally connected to the other second ski arm pivotal member so that the skis rotate together; and
(v) said selected connecting rod being pivotally connected to the steering arm pivotal member and the first ski arm pivotal member so that rotation of the steering column which places the selected connecting rod in tension causes the first ski arm pivotal member to rotate in the first direction, and rotation of the steering column which places the selected connecting rod in compression causes the first ski arm pivotal member to rotate in the second direction; wherein the hydraulic cylinder at one end is pivotally connected to the snowmobile chassis, and from another end extends the end rod which is pivotally connected to the steering connecting rod.

4. A power steering system for steering a snowmobile having a body with a chassis, and a pair of laterally spaced steerable skis, the power steering system comprising:
(a) a source of hydraulic pressure including a reservoir for storing hydraulic fluid;
(b) a hydraulic cylinder which is mounted to the snowmobile body and has two chambers and at least one end rod;
(c) a steering column; and
(d) a linkage arrangement including interconnected connecting rod and pivotal members which together transmit force from the steering column to the skis to selectively rotate the skis, wherein a selected connecting rod transmits a tensile force when the skis are being rotated in a first direction by force transmitted from the steering column, and a compressive force when the skis are being rotated in a second direction by force transmitted from the steering column, the linkage arrangement being operably connected to the hydraulic cylinder end rod so that movement of the end rod rotates the skis; and wherein the selected connecting rod includes a control valve means for selectively directing hydraulic pressure to a hydraulic cylinder chamber to move the end rod so the skis rotate in the first direction when the selected connecting rod transmits a tensile force and for selectively directing hydraulic pressure to the other hydraulic cylinder chamber to move the end rod so the skis rotate in the second direction when the selected connecting rod transmits a compressive force, the hydraulic cylinder thereby augmenting the force transmitted to the linkage arrangement by the steering column;

wherein the selected connecting rod includes two connecting portions through which the control valve directing means is connected to a remainder of the linkage assembly, and the control valve directing means comprises a four-way, three-position control valve including:

(i) a spool including a first, second, and third wide damper portions, a first narrow portion between the first and second wide damper portions, and a second narrow portion between the second and third wide damper portions, the spool being in rigid connected relation to one of the connecting portions;

(ii) a valve housing which is in rigid connected relation to another of the connecting portions and has a back end; a front end; and axial bore which opens to at least the back end and which substantially contains the spool, a control portion of the axial bore having a diameter substantially equal to that of the spool wide damper portions, an inner surface of the control portion of the axial bore and narrow portions of the spool defining a first and second slidable passageways; a first return passageway communicating with the reservoir and with the axial bore in proximity to the spool first wide damper portion through a first return orifice; a first cylinder passageway located forwardly from the first return passageway and communicating with one of the hydraulic cylinder chambers and the axial bore at the first slidable passageway through a first cylinder orifice; a pressure passageway located forwardly from the first cylinder passageway and communicating with the source of hydraulic pressure and the axial bore in proximity to the spool second wide damper portion through a pressure orifice; a second cylinder passageway located forwardly from the pressure passageway and communicating with another of the hydraulic cylinder chambers and the axial bore at the second slidable passgeway through a second cylinder orifice; and a second return passageway located forwardly from the second cylinder passageway and communicating with the reservoir and with the axial bore in proximity to the spool third wide damper portion through a second return orifice;

wherein the spool is axially slidable within the axial bore between: a rearward position in which hydraulic pressure is directed from the pressure passageway through the second slidable passageway to the second cylinder passageway, the spool third wide damper portion blocks hydraulic pressure from entering the second return passageway from the second slidable passageway, hydraulic fluid is exhausted from the first cylinder passageway through the first slidable passageway to the first return passageway, and the spool second wide damper portion blocks hydraulic pressure from entering the first slidable passageway from the pressure passageway; a central position in which the spool second wide damper portion at least partially blocks the pressure passageway so that the hydraulic pressure directed through the slidable passageways to the cylinder passageways, if any, is equal; and a forward position in which hydraulic pressure is directed from the pressure passageway through the first slidable passageway to the first cylinder passageway, the spool first wide damper portion blocks hydraulic pressure from entering the first return passageway from the first slidable passageway, hydraulic fluid is exhausted from the second cylinder passageway through the second slidable passageway to the second return passageway, and the spool second wide damper portion blocks hydraulic pressure from entering the second slidable passageway from the pressure passageway; and (iii) means for biasing the spool to the central position and for transmitting tensil and compressive forces through the valve housing and spool so that force can be transmitted from a connecting portion to the spool, through the spool central biasing and force transmitting means to the valve housing and then to the other connecting portion, and conversely.

5. The power steering system of claim 4 wherein the pressure orifice is ellipsoidal in shape with a minor axis parallel to an axis of the spool, so that relatively little axial movement of the spool from its central position is required to block a flow of hydraulic fluid from the pressure passageway into one of the slidable passageways.

6. The power steering system of claim 4 wherein the return orifices are ellipsoidal in shape, each with a minor axis which is parallel to an axis of the spool, so that relatively little axial movement of the spool from its central position is required to block a flow of hydraulic fluid from one of the slidable passageways into an adjacent return passageway.

7. The power steering system of claim 4 wherein the first and second return passageways connect communicate with one another and the reservoir and a conduit extends between the pressure passageway and one of the return passageways, the conduit having a check valve which prevents flow from the pressure passageway into the return passageways, but which allows flow from the return passageways into the pressure passageways when the source of hydraulic pressure is nonfunctional and when the steering column is rotated at a speed which exceeds the ability of the power steering system to rotate the skis, so that the power cylinder end rod can move to allow the skis to be rotated manually with the steering column.

8. The power steering system of claim 7 wherein the conduit is formed within the valve housing.

9. The power steering system of claim 4 wherein the central position biasing and force transmitting means comprises:
 (a) a spool rearward facing surface which moves axially with axial movement of the spool;
 (b) a housing forward facing surface which is in fixed relation to the housing and is in opposition to the spool rearward facing surface;
 (c) a spool forward facing surface which moves axially with axial movement of the spool;
 (d) a housing rearward facing surface which is maintained in a fixed relation to the housing and is in opposition to the spool forward facing surface; and
 (e) at least one elastic member between those surfaces which are in opposition to each other.

10. The power steering system of claim 9 wherein a biasing portion of the axial bore has a diameter larger than that of an outer surface of the spool contained therein so that an inner surface of the biasing portion of the axial bore is spaced outwardly from the spool, the valve housing includes the housing forward facing surface where the control portion and biasing portion of the axial bore join, the valve includes a sleeve within the axial bore biasing portion which is maintained in a fixed relation to the housing, the sleeve includes the housing rearward facing surface, and the bore biasing portion inner surface, housing forward facing surface, housing rearward facing surface and spool outer surface form an annular space;
 wherein the spool includes a flange portion which extends outwardly from the spool outer surface into the annular space centrally between the housing forward facing surface and housing rearward facing surface when the spool is in its central position, the flange including the spool rearward facing surface and the spool forward facing surface; and
 wherein the elastic members comprise two sets of elastic rings, a first set of rings located within the annular space between the housing forward facing surface and spool flange, and a second set located between the spool flange and the housing rearward facing surface, so that rearward movement of the spool from its central position compresses the first set of rings to bias the spool toward the central position and to transmit a tensile force between the housing and spool, and so that forward movement of the spool from its central position compresses the second set of rings to bias the spool toward the central position and to transmit a compressive force between the housing and spool.

11. The power steering system of claim 10 wherein the valve includes an adjusting collet with a threaded outside surface which is adjustably screwed into a threaded portion of the axial bore biasing portion which is located forwardly from the sleeve, the collet having a rearward end which abuts against the sleeve to maintain the sleeve in fixed relation to the housing, and a forward end which extends out a forward end of the bore to receive a lock nut which abuts against the housing to lock the adjusting collet in fixed relation to the housing.

12. The power steering system of claim 10 wherein the elastic rings are O-rings.

13. A four-way, three-position control valve comprising:
 (a) A spool including a first, second, and third wide damper portions, a first narrow portion between the first and second wide damper portions, and a second narrow portion between the second and third wide damper portions;
 (b) a valve housing which has a back end; a front end; and axial bore which opens to at least the back end and which substantially contains the spool, a control portion of the axial bore having a diameter substantially equal to that of the spool wide damper portions, an inner surface of the control portion of the axial bore and narrow portions of the spool defining a first and second slidable passageways; a first return passageway adapted to communicate with a reservoir for storing hydraulic fluid and communicating with the axial bore in proximity to the spool first wide damper portion through a first return orifice; a first cylinder passageway located forwardly from the first return passageway and adapted to communicate with one of two power cylinder chambers in a hydraulic cylinder and communicating with the axial bore at the first slidable passageway through a first cylinder orifice; a pressure passageway located forwardly from the first cylinder passageway and adapted to communicate with a source of hydraulic pressure and communicating with the axial bore in proximity to the spool second wide damper portion through a pressure orifice; a second cylinder passageway located forwardly from the pressure passgeway and adapted to communicate with another of the power cylinder chambers and communicating with the axial bore at the second slidable passageway located forwardly from the second cylinder passageway and adapted to communicate with the reservoir and communicating with the axial bore in proximity to the spool third wide damper portion through a second return orifice;
 wherein the spool is axially slidable within the axial bore between: a rearward position in which hydraulic pressure is directed from the pressure passageway through the second slidable passageway to the second cylinder passageway, the spool third wide damper portion blocks hydraulic pressure from entering the second return passageway from the second slidable passageway, hydraulic fluid is exhausted from the first cylinder passageway through the first slidable passageway to the first return passageway, and the spool second wide damper portion blocks hydraulic pressure from entering the first slidable passageway from the pressure passageway; a central position in which the spool second wide damper portion at least partially blocks the pressure passageway so that the hydraulic pressure directed through the slidable passageways to the cylinder passageways, if any, is equal; and a forward position in which hydraulic pressure is directed from the pressure passageway through the first slidable passageway to the first cylinder passageway, the spool first wide damper portion blocks hydraulic pressure from entering the first return passageway from the first slidable passageway, hydraulic fluid is exhausted from the second cylinder passageway through the second slidable passageway to the second return passageway, and the spool second wide damper portion blocks hydraulic pressure from entering the second slidable passageway from the pressure passageway; and (c) means for biasing the spool to the central position and for transmitting tensile and compressive forces through the valve housing and spool so that force can be transmitted from the spool through the spool central biasing and force transmitting means to the valve housing and conversely.

14. The four-way, three-position control valve of claim 13 wherein the pressure orifice is ellipsoidal in shape with a minor axis parallel to an axis of the spool, so that relatively little axial movement of the spool form its central position is required to block a flow of hydraulic fluid from the pressure passage into one of the annular passageways.

15. The four-way, three-position control valve of claim 13 wherein the return orifices are ellipsoidal in shape, each with a minor axis which is parallel to an axis of the spool, so that relatively little axial movement of the spool from its central position is required to block a flow of hydraulic fluid from one of the annular passageways into an adjacent return passageway.

16. The four-way, three-position control valve of claim 13 wherein the first and second return passageways connect to communicate with one another and the reservoir and a conduit extends between the pressure passageway and one of the return passageways, the conduit having a check valve which prevents flow from the pressure passageway into the return passageways, but which allows flow from the return passageways into the pressure passageway when the source of hydraulic pressure is non-functional.

17. The four-way, three-position control valve of claim 16 wherein the conduit is formed within the valve housing.

18. The four-way, three-position control valve of claim 13 wherein the central position biasing and force transmitting means comprises:

(a) a spool rearward facing surface which moves axially with axial movement of the spool;
(b) a housing forward facing surface which is in fixed relation to the housing and is in opposition to the spool rearward facing surface;
(c) a spool forward facing surface which moves axially with axial movement of the spool;
(d) a housing rearward facing surface which is maintained in a fixed relation to the housing and is in opposition to the spool forward facing surface; and
(e) at least one elastic member between those surfaces which are in opposition to each other.

19. The four-way, three position control valve of claim 18 wherein a biasing portion of the axial bore has a diameter larger than that of an outer surface of the spool contained therein so that an inner surface of the biasing portion of the axial bore is spaced outwardly from the spool, the valve housing includes the housing foreward facing surface where the control portion and biasing portion of the axial bore join, the valve includes a sleeve within the axial bore biasing portion which is maintained in a fixed relation to the housing, the sleeve includes the housing rearward facing surface, and the bore biasing portion inner surface, housing forward facing surface, housing rearward facing surface and spool outer surface form an annualar space;

wherein the spool includes a flange portion which extends outwardly from the spool outer surface into the annular space centrally between the housing forward facing surface and housing rearward facing surface when the spool is in its central position, the flange including the spool rearward facing surface and the spool forward facing surface; and wherein the elastic members comprise two sets of elastic rings, a first set of rings located within the annular space between the housing foreward facing surface and spool flange and a second set located between the spool flange and the housing rearward facing surface, so that rearward movement of the spool from its central position compresses the first set of rings to bias the spool toward the central position and to transmit a tensil force between the housing and spool, and so that forward movement of the spool from its central position compresses the second set of rings to bias the spool toward the central position and to transmit a compressive force between the housing and spool.

20. The four-way, three-position control valve of claim 19 wherein the valve includes an adjusting collet with a threaded outside surface which adjustably screwed into a threaded portion of the axial bore biasing portion which is located forwardly from the sleeve, the collet having a rearward end which abuts against the sleeve to maintain the sleeve in fixed relation to the housing, and a forward end which extends out a forward end of the bore to receive a locknut which abuts against the housing to lock the adjusting collet in fixed relation to the housing.

21. The four-way, three position control valve of claim 19 wherein the elastic rings are O-rings.

* * * * *